US007655164B2

(12) United States Patent
Poulin et al.

(10) Patent No.: US 7,655,164 B2
(45) Date of Patent: Feb. 2, 2010

(54) METHOD FOR OBTAINING MACROSCOPIC FIBRES AND STRIPS FROM COLLOIDAL PARTICLES AND IN PARTICULAR CARBON NANOTUBES

(75) Inventors: Philippe Poulin, Talence (FR); Brigitte Vigolo, Bordeaux (FR); Alain Penicaud, Bordeaux (FR); Claude Coulon, Talence (FR)

(73) Assignee: Centre National de la Recherche Scientifique, Paris (FR)

( * ) Notice: Subject to any disclaimer, the term of this patent is extended or adjusted under 35 U.S.C. 154(b) by 580 days.

(21) Appl. No.: 10/204,794

(22) PCT Filed: Feb. 23, 2001

(86) PCT No.: PCT/FR01/00544

§ 371 (c)(1),
(2), (4) Date: Dec. 9, 2002

(87) PCT Pub. No.: WO01/63028

PCT Pub. Date: Aug. 30, 2001

(65) Prior Publication Data

US 2003/0102585 A1 Jun. 5, 2003

(30) Foreign Application Priority Data

Feb. 23, 2000 (FR) .................................. 00 02272

(51) Int. Cl.
*D01F 1/00* (2006.01)
*D01F 9/12* (2006.01)

(52) U.S. Cl. .................... 264/180; 264/178 R; 264/203; 977/742

(58) Field of Classification Search ................. 264/185, 264/203, 183, 178 R, 180, 181; 977/742
See application file for complete search history.

(56) References Cited

U.S. PATENT DOCUMENTS 2,955,017 A * 10/1960 Boyer ......................... 264/180
2,972,221 A * 2/1961 Wilke et al. .................... 264/83
2,973,018 A * 2/1961 Finlayson et al. ........... 139/391

(Continued)

FOREIGN PATENT DOCUMENTS

FR 2088130 1/1992

(Continued)

OTHER PUBLICATIONS

Translation of French Patent 2088130 to Claude Carrere, Jan. 7, 1972, pp. 1-7.*

(Continued)

*Primary Examiner*—Matthew J. Daniels
(74) *Attorney, Agent, or Firm*—Conley Rose, P.C.

(57) ABSTRACT

The invention concerns a method for obtaining fibers and strips from colloidal particles, characterized in that it consists in: 1) dispersing said particles in a solvent optionally using a surfactant; 2) injecting the resulting dispersion solution through at least an orifice emerging into a flow of an external solution, preferably, having a higher viscosity than said dispersion, the viscosity levels being measured in the same temperature and pressure conditions, so as to cause said particles to agglomerate into fibers or strips by destabilizing the particle dispersions and optionally aligning said particles.

16 Claims, 3 Drawing Sheets

U.S. PATENT DOCUMENTS

| | | | |
|---|---|---|---|
| 2,988,782 A * | 6/1961 | Parrish et al. | 264/69 |
| 3,338,884 A * | 8/1967 | Miller | 536/86 |
| 3,405,004 A * | 10/1968 | Hall et al. | 162/168.1 |
| 3,687,765 A * | 8/1972 | MacLean et al. | 156/187 |
| 3,761,406 A * | 9/1973 | Tsuk | 210/725 |
| 3,833,438 A * | 9/1974 | Kaneko et al. | 156/167 |
| 3,943,220 A * | 3/1976 | Barnett et al. | 264/103 |
| 4,414,267 A * | 11/1983 | Coran et al. | 428/361 |
| 5,089,188 A * | 2/1992 | Varaprasad et al. | 264/41 |
| 5,219,508 A * | 6/1993 | Collier et al. | 264/171.13 |
| 5,422,050 A * | 6/1995 | Graiver et al. | 264/28 |
| 5,705,631 A * | 1/1998 | Malcolm | 536/69 |

FOREIGN PATENT DOCUMENTS

| | | |
|---|---|---|
| GB | 1174959 | 12/1969 |
| WO | WO99/36604 | 7/1999 |

OTHER PUBLICATIONS

Merriam-Webster's Collegiate Dictionary, Tenth Edition, Merriam-Webster, Inc., 1998, p. 602.*

Vigolo, et al, Macroscopic Fibers and Ribbons of Oriented Carbon Nanotubes, Science, Nov. 17, 2000, vol. 290, Issue 5495, p. 1331.*

Andrews, R., et al., *Nanotube Composite Carbon Fibers*, Applied Physics Letters, American Institute of Physics; vol. 75, No. 9, Aug. 30, 1999 (pp. 1329-1331).

* cited by examiner

METHOD FOR OBTAINING MACROSCOPIC FIBRES AND STRIPS FROM COLLOIDAL PARTICLES AND IN PARTICULAR CARBON NANOTUBES

The present invention relates to a method of obtaining macroscopic fibres and strips from colloidal particles. It relates more particularly to a spinning method allowing fibres of carbon nanotubes to be obtained.

According to another aspect of the invention, it relates to macroscopic fibres and strips produced from colloidal particles that may be anisotropic.

Owing to their excellent physical properties, carbon nanotubes find applications in numerous fields, in particular in electronics (depending on their temperature and their structure, they can be conductors, semiconductors or insulators), in mechanical engineering, for example for the reinforcement of composites (the nanotubes are a hundred times stronger and six times lighter than steel) and electrical engineering (they can be made to expand or contract by applying a charge).

Unfortunately, at present the main drawback to their industrial application arises from the absence of production in macroscopic form with controlled structure.

Production of these nanotubes as macroscopic fibres or strips would greatly facilitate their handling (transport, storage etc.) and would make the nanotubes more useful for the above applications.

Thus, the carbon fibres used in particular in the composites industry are obtained in a conventional manner by processes of spinning a viscoelastic mixture. They are produced for example by drawing out a viscoelastic polymer or by direct drawingout of carbon pitch neated to make it viscoelastic, followed by carbonization by heating. This technique, which is very general, can also be applied to plastics, to glass or to metals.

On the other hand, this high-temperature process cannot be applied to solutions containing colloidal particles because there is a risk of causing decomposition of the solvents. Nor can it be applied to carbon nanotubes, since heating of the latter causes their degradation before a viscoelastic state is attained.

The present invention therefore aims to overcome these drawbacks by proposing a method of obtaining macroscopic fibres and strips from colloidal particles, in particular carbon nanotubes, dispersed in a solution. It also relates to fibres and strips thus obtained.

For this purpose, the method of obtaining fibres and strips from colloidal particles according to the invention is characterized in that:

1) the said particles are dispersed in a solvent, optionally with the aid of a surfactant, 2) the dispersing solution is injected through at least one orifice opening into a stream of an external solution, preferably of viscosity greater than that of the said dispersion, the viscosities being measured in the same conditions of temperature and pressure, so as to cause aggregation of the said particles as fibres or strips by destabilizing the dispersions of particles and possibly aligning the said particles.

Other characteristics and advantages of the present invention will become clear from the description that follows, referring to the appended drawings that illustrate one example of application, without being in any way limiting. In these drawings.

Figure 1:
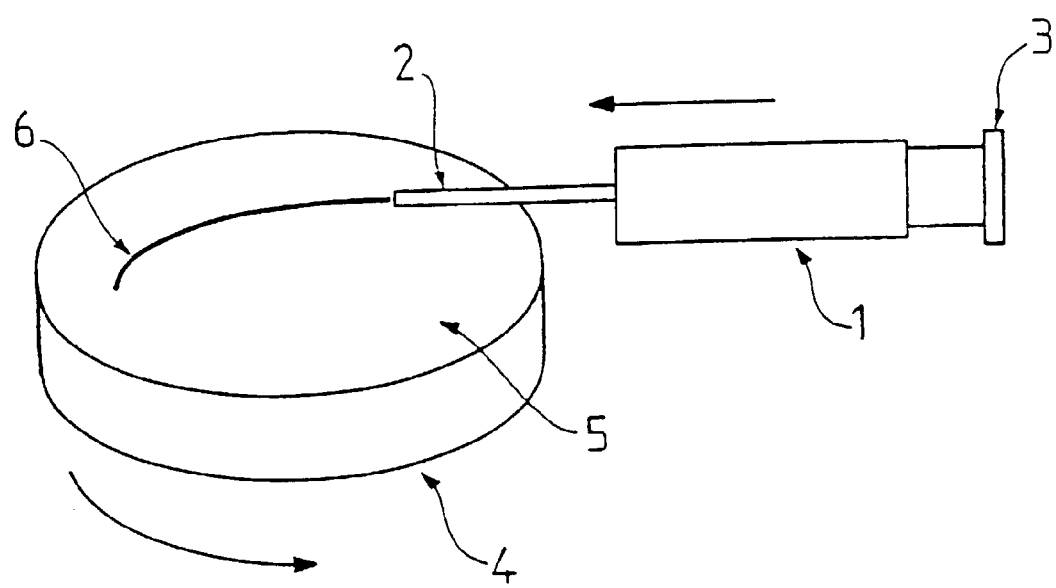
FIG. 1 is a perspective side view of a schematic example of an experimental device for applying the second stage of the method according to the invention.

According to a preferred embodiment of the invention, the method of obtaining macroscopic fibres and strips from colloidal particles comprises at least two stages.

A first stage consists of dispersing the colloidal particles, and in particular the nanotubes, in an aqueous or organic solution. To achieve this, particles of a hydrophobic nature are dispersed in a solvent such as water or an alcohol such as ethanol, optionally with the aid of a surfactant that is used conventionally for dispersing hydrophobic particles in such a solvent. When surfactant is used, coating the particles, their flocculation can be prevented and their dispersion is therefore stable. In the case when the solvent used is water, the said dispersion can be obtained with various anionic, cationic or neutral, molecular or polymeric surfactants, for example sodium dodecyl sulphate (SDS), alkaryl esters or tetradecyltrimethylammonium bromide. Depending on the characteristics of the agents used, their concentration varies from a few thousands of % to several %.

The initial dispersions of colloidal particles, for example of nanotubes, must be as homogeneous as possible. Homogeneity can be tested in a simple, routine manner by optical microscopy, it being easy for the presence of inhomogeneities resulting from the presence of aggregates of particles to be detected optically.

The strips or fibres formed with more dilute dispersions of colloidal particles are very fragile and difficult to handle for conversion to threads. It is also difficult to make strips and fibres with more concentrated suspensions because it is difficult to obtain homogeneous concentrated dispersions. However, it is always preferable to use suspensions that are as concentrated as possible, while endeavouring to keep the suspensions homogeneous.

With raw nanotubes synthesized by an electric arc, it is advantageous to use for example the following concentrations by weight for making the initial dispersions:

solvent:water between 0.3 and 0.5% of nanotubes between 1 and 1.5% of SDS dispersant.

With nanotubes made by the HiPco method, which are easier to use than the nanotubes synthesized by electric arc, lower concentrations can be employed, for example down to 0.1 wt. % %.

In general, the dispersions will preferably be formulated using an ultrasonic homogenizer. It is much faster and more efficient to use a homogenizer with a probe immersed directly in the dispersion rather than use an ultrasonic bath. The power of ultrasonic baths is usually too low to produce homogeneous and relatively concentrated dispersions of particles.

The second stage of the method according to the invention consists of injecting the aqueous or organic dispersions of particles obtained after the first stage through at least one orifice opening into the laminar flow of an external solution whose viscosity should preferably be greater than that of the said dispersions, the viscosities being measured in the same conditions of temperature and pressure, in order to cause, because of the shearing forces, alignment of the colloidal particles in the direction imposed initially by the flow of the said external solution. To achieve this result, it is possible to use, as viscosity modifier of the external solution, a polymer which may for example be a polyol or a polyalcohol (polyvinyl alcohol, alginate or cellulose, for example) or a mineral (clay, for example).

Furthermore, the said external solution should preferably contain chemical agents which can induce the coagulation (or flocculation) of the dispersed particles, in particular polymers that are capable of producing bridging effects.

Thus, when the aqueous or organic dispersions of particles containing the surfactant are injected through the said orifice into the external solution, adsorbed molecules of the said surfactant can be displaced by the viscosity modifier or a flocculating agent of the external solution; then the particles are no longer stabilized and so they form aggregations at the outlet of the orifice to form strips or fibres whose cross-section is a function of the cross-section of the said orifice used. More simply, aggregation of the particles can also be induced by desorption of the surfactant. In addition, even if the surfactants remain adsorbed, the said particles may aggregate in the presence of a flocculating agent.

Several flocculating agents can be used: polyvinyl alcohol, chitosan, weakly charged polyelectrolytes, for example a copolymer of acrylamide and acrylic acid (which also perform the role of viscosity modifier), salts (Na+Cl−, K+Cl−) or a surfactant that is neutral or of opposite charge to that of the agent used for dispersing the particles in the first stage of the method, if the latter is ionic.

Generally a PVA of high molecular weight is used (of the order of 100000 g/mol or more) to give better cohesion to the strip or to the fibre. Advantageously, a water-soluble PVA is used, of molecular weight above 10000 and in particular between 10 000 and 200 000. This increase in efficacy with the size of the polymer seems to arise from the fact that aggregation of the particles is due to a "so-called" bridging effect of the particles by the PVA.

PVAs of low molecular weight (of the order of 10000-15000 g/mol) dissolve faster and can be used at a higher concentration as they cause less increase in viscosity of the solutions.

They have the advantage of being rapidly adsorbed and of being more easily desorbed than the polymers of high molecular weight. However, the strips and fibres are a little more fragile, which would be explained by less effective bridge formation.

Filtering of the PVA solutions may prove necessary if they are not homogeneous.

According to an advantageous characteristic of the invention, the fibres or strips obtained can be washed using a rinsing product at the end of this second stage so that the external solution and the dispersants are desorbed completely. In particular, this stage can consist of successive rinsings with pure water.

In addition, the density of the fibres and strips can be controlled by the concentration of the initial dispersion of the particles. For example, in the case of carbon nanotubes, the said mass fractions are typically less than a few %.

According to another advantageous characteristic of the invention, the method comprises a last stage that consists of densifying the macroscopic fibres and strips.

The implementation of this last stage therefore consists of slowly drawing the fibres or strips out of the rinsing product (in particular water). Thus, a capillary contraction occurs when the said fibres or strips are out of the solvent, and this contraction leads to a first densification which is then increased by evaporation of the solvent.

We shall now describe the various parameters employed in the course of the method according to the invention.

The first stage consists essentially of intimate mixing of the colloidal particles and a solvent (aqueous or organic) to obtain a solution possessing the properties of a dispersion.

To comply with the various constraints of the second stage of the method, several types of device may be suitable:
either an installation that operates in batch mode,
or, on the other hand, an installation that operates continuously.

Thus, according to a first family of installations, it is a reactor or a vessel for containing the external solution, which is set in motion, in particular in rotation, by a motor (rotating plate, for example). The said vessel can also be equipped with a double jacket allowing circulation of a heat-transfer fluid, so as to change the temperature of the external solution and therefore its physicochemical parameters (viscosity, etc.).

By controlling the rotary speed of the motor, the medium is imparted optimum hydraulic conditions in particular in terms of velocity and flow rate, ensuring entrainment of the aqueous or organic dispersion that is discharged through the multiplicity of orifices located in the circulating streams of the external solution.

The orifices, whose cross-section can be of various profiles (rectangular, cylindrical, square, conical, etc.), are connected by pipelines to another tank containing the aqueous or organic dispersion. Moreover, metering pumps and/or centrifuges are to be fitted in the feed circuit between the buffer tank containing the said dispersion and the separation tank in the external solution, so as to impart to the dispersion (aqueous or organic), depending on the operating parameters of the pumps (rotary speed, delivery pressure, flow rate etc.), optimum hydraulic conditions.

In an installation which is operating continuously, the characteristics of the circuit for feeding the dispersion are identical to those of an installation operating in batch mode. This installation, of known type, can have the characteristics of that employed in the textile industry or for the spinning of polymers.

On the other hand, the vessel containing the external solution is provided with inlet and outlet orifices through which the external solution is introduced then discharged, this being conducted in defined conditions of circulation and therefore of entrainment with respect to the dispersion, optionally by means of a pressurizing circuit (pump, buffer tank etc.) and by means of a return circuit optionally including pumps or circulating means.

Of course, all of these installations, whether operating in batch mode or continuously, can be controlled by an automatic system or a computerized process operating unit so that the user can be provided with information relating to the separation process, in order to obtain the optimum operating conditions.

Accordingly, and more generally, the higher the viscosity of the external solution relative to that of the aqueous or organic dispersion (under the same conditions of temperature and pressure), the smaller the size of the calibrated orifice and the higher the flow rate of the said external solution, the greater the shearing forces caused and the nore pronounced the alignment of the particles is. For example, a fine orifice with a viscous external solution flowing at high velocity produces anisotropic structures. Conversely, an orifice of large cross-section with an external solution of low viscosity flowing slowly produces fibres and strips where there is little or no alignment of the particles.

During this stage it is advisable to keep within laminar flow conditions. Flows which are excessively fast and turbulent do not allow long and uniform fibres or strips to be obtained.

Aqueous solutions of polyvinyl alcohol (PVA) are very effective for destabilizing suspensions of particles and causing their aggregation. Furthermore, PVA is a polymer that increases the solution viscosity considerably, thus facilitating laminar flow.

The most readily available tubes for injection of the dispersion of particles are cylinders or needles. It is possible to use tubes with diameter between 0.5 and 1.0 mm. Tubes with thin walls are preferably chosen so as not to cause turbulence when the PVA solution and the dispersion of particles meet one another.

Preferably, in the case of nanotubes synthesized by electric arc, the dispersions of which are injected through a cylindrical tube of 0.7 mm diameter, the injection rate used will be between 0.8 and 2.5 $cm^3$/minute and the flow rate of the PVA solution at nanotube injection will be between 5 and 30 m/min.

A low injection rate and a high flow rate of the PVA solution lead to strong shearing forces that stretch the strip or fibre. Consequently, the strip or fibre is thinner and the alignment of the nanotubes is more pronounced. If the shearing forces are too great, however, this has the drawback of making the strips or fibres more fragile, because they are thinner. Moreover, it is important not to use flows that are too fast, to avoid conditions of turbulence.

A high injection rate and a low flow rate lead to strips or fibres that are thicker and therefore more solid. These conditions therefore facilitate the production of fibres. However, these conditions do not promote alignment of the nanotubes in the strip or fibre.

Higher velocities can be used for the HiPco nanotubes, while maintaining good mechanical properties of the strips or fibres.

Finally, the method according to the invention can be applied to colloidal particles in general, and more particularly to anisotropic particles (for example, nanotubes of carbon, tungsten sulphide, boron nitride, clay flakes, cellulose whiskers, silicon carbide whiskers, etc.).

With regard to the stage of densification of the strips or fibres, when the strip or the fibre is withdrawn vertically from the water, it will have a tendency to dry faster if it is drawn quite rapidly. This makes it possible for the water contained in the strip or fibre to be carried higher. Consequently, subsequent drainage and drying are fastest.

On the other hand, withdrawal must be slow enough to avoid submitting the strip or fibre to high tensile forces that might break it.

Maximum withdrawal speeds vary considerably depending on the size and quality of the strips or fibres and the nature of the particles. If time is not a constraint, it is preferable in that case to effect withdrawal slowly so as not to risk breaking the strip or fibre. The small tensile forces that result from this are not optimum for encouraging particle alignment, but other operations are possible for encouraging such alignment in strips and fibres. It is also possible to transfer the rinsed strips or fibres to solvents that are more volatile than water (alcohol or acetone for example) to obtain faster drying during withdrawal.

Operations of rinsing and washing with pure water do not allow desorption of the largest molecules of flocculent, for example PVA, within a reasonable time (a few days). Consequently, residues of flocculant are left behind in the final strips or fibres. This has an important consequence for the strips or fibres that are formed. Partial swelling of the strips or fibres occurs when they are put in water again. Their length increases spontaneously by several % and their diameter can double.

The effects for example of PVA (or of other flocculants) can be avoided by annealing at high temperature (above 400° C.) which causes the PVA to decompose.

It is also possible to anneal the strip or fibre at a moderate temperature so as to melt the viscosity modifier, for example PVA, without causing it to decompose (temperature below 300° C.). Drawing of the fibre in these conditions also improves the alignment of the particles.

Advantageously, this annealing can be accompanied by further addition of polymer and/or of plasticizer. This addition at high temperature also makes it possible to obtain a coated fibre or strip.

More generally, the structure and the properties of the strips or fibres can be modified by mechanical action (in particular tension and/or torsion) exerted on them. These operations are preferably carried out on objects that are less brittle than the fibre directly obtained after rinsing and drying. These operations can easily be carried out on the initial strip or fibre, in the presence of elastomer or of polymer melted at high temperature or during annealing.

In addition, the operation of condensation and drying of the strip or fibre makes it possible to separate the colloidal particles and impurities present. Impurities such as amorphous carbon or graphite tend to form an outer envelope around a cylinder constituted primarily of nanotubes for example.

This phenomenon can be used for making novel materials. Particles of micrometer or nanometer size can be added deliberately to the external solution containing the strip or the fibre. These particles are then entrained during drawing out of the strip or fibre to form the final strip or fibre. With the particles behaving like carbon-containing impurities, they form an outer envelope around the strip or fibre of colloidal particles. Such an effect can be used for example for making thin envelopes of isolating polymer around strips or fibres of colloidal particles, for example using latex particles.

Envelopes of various kinds can be obtained with other types of particles on any type of strips or fibres according to the invention.

Separation between particle and strip or fibre seems to arise from lateral drainage of the solvent during withdrawal and drawing out of the strip or fibre. When the strip or fibre is withdrawn from the solvent, drainage entrains the particles onto their periphery. By concentrating at the periphery, the particles form an outer envelope around the core of the strip or fibre. This phenomenon is observed in any system that contains a strip or a fibre formed from particles or from polymers in the presence of other particles, possibly of various forms, with little or no bonding to the particles or polymers which form the fibre. Absence or weakness of the bonds between the particles and the strip or fibre will enable drainage to separate the various constituents and end up with a strip or fibre formed from a core and an envelope of dissimilar natures.

Fibres or strips are then obtained comprising an envelope, formed by the peripheral drying, of particles of micrometer or nanometer size around the said fibres or strips.

A schematic example of an experimental device for implementing this second stage of the method starting from a solution of carbon nanotubes dispersed in water in the first stage will now be described.

As shown in FIG. 1, this comprises in particular a syringe 1 or equivalent, in which is placed the aqueous solution of nanotubes dispersed in the first stage. A capillary 2 of very flat cross-section fixed to the syringe permits discharge of the said solution by pressing on a plunger 3 of the said syringe into a cylindrical vessel 4 provided for this purpose. The injection rate is between a few tenths of $cm^3$ per minute to several $cm^3$ per minute.

The cylindrical vessel 4, which has fairly flat sides, is fixed on a plate (not shown) that is made to rotate, at a speed varying from several tens to several hundreds of revolutions per minute. The outlet end of capillary 2 is submerged in an external solution 5 (preferably of high viscosity) contained in the said vessel. More particularly, the said outlet end of the said capillary is positioned tangentially to vessel 4, away from its axis of rotation. The solution of dispersion of nanotubes of low viscosity is then entrained under the effect of the shearing forces at the outlet of the capillary by the solution 5, causing alignment of the nanotubes in the direction of the velocity of the fluid.

In fact, when the solution of dispersed nanotubes containing the surfactant is injected by syringe 1 through capillary 2 into the viscous solution 5, the molecules of the surfactant are displaced by the viscosity modifier of solution 5. Moreover, because the nanotubes are not stabilized by the flocculant of the external solution 5, they undergo aggregation on discharge from capillary 2, forming strips or fibres 6 depending on the cross-section of the capillary employed.

The characteristics of the macroscopic fibres and strips according to the invention, obtained from colloidal particles, optionally anisotropic, and more particularly from carbon nanotubes will now be described.

Figure 2:
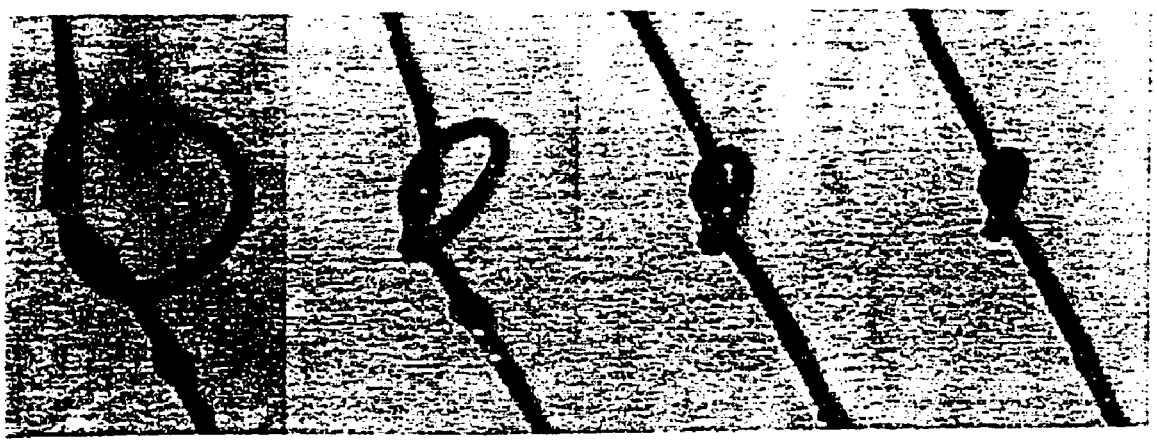
FIG. 2 is a series of photographs showing the formation of a knot from a fibre of entangled nanotubes obtained by the method according to the invention.

These carbon fibres and strips are constituted of entangled nanotubes. This structure endows the said fibres with considerable flexibility, while maintaining good mechanical properties in tension owing to the arrangement of the carbon in the form of graphite cylinders in the nanotubes. For example, as shown in FIG. 2, the said fibres can be highly curved so as to make knots or to be woven.

Furthermore, these fibres are extremely fine and dense. For example, it is possible to obtain fibres of variable length, with diameter ranging for example from 1 to 100 microns and whose density can reach about 1.5 g/cm$^3$, a density that is close to what is expected theoretically for compact stacking of nanotubes (1.3 g/cm$^3$).

In addition, the fibres and strips obtained can have an anisotropic structure in which the nanotubes would have a preferential orientation. This orientation is an important parameter for magnifying the electrical and mechanical responses of a given material. This structural anisotropy can be tested by optical microscopy between crossed polarizers. Thus, FIGS. 3a, 3b and 3c clearly show that the intensity transmitted by the strip depends on its orientation relative to the axes of the polarizers.

Figure 3A:
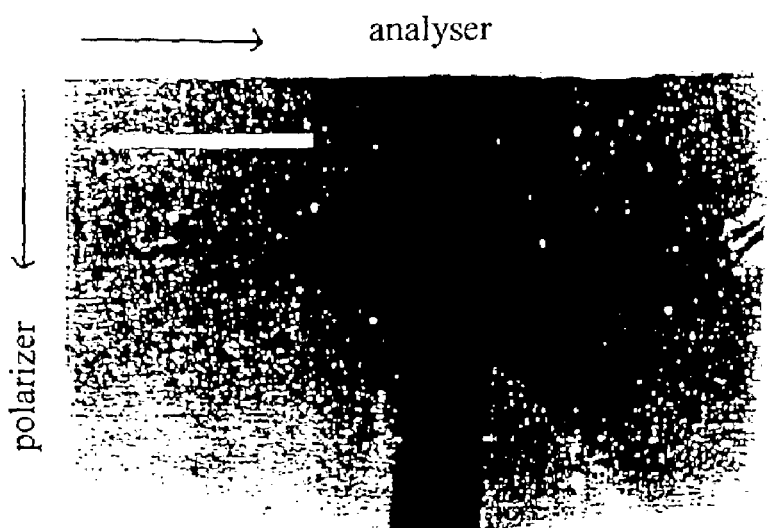
FIGS. 3a, 3b and 3c show photographs of a strip of carbon nanotubes obtained by the method according to the invention and observed between a crossed polarizer and analyser by optical microscopy.
Figure 3B:
Figure 3C:
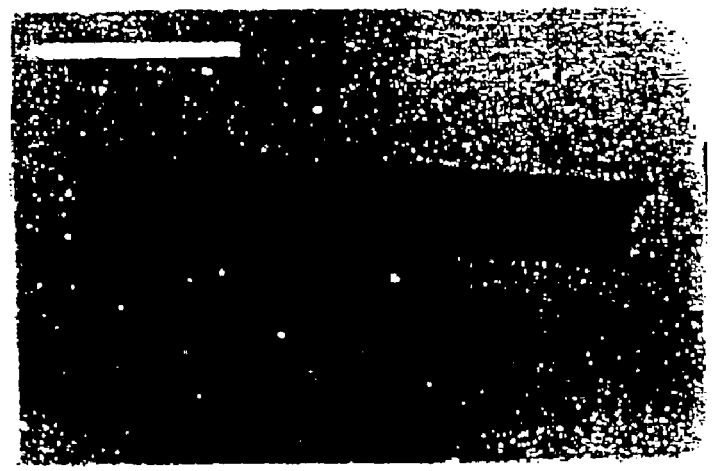

In the photographs in FIGS. 3a to 3c, the axes of the polarizer and of the analyser are the vertical and horizontal axes respectively. For example, in FIG. 3a, the strip is parallel to the polarizer and light does not pass through. The same applies to FIG. 3c, where the strip is parallel to the analyser. On the other hand, when the strip is inclined by 45° relative to the polarizer and the analyser (FIG. 3b), the latter allows some of the light to pass through. This reflects the preferential alignment of the carbon nanotubes along the principal axis of the strip, i.e. in the direction imposed initially by the flow of the external solution.

It is also possible to obtain fibres or strips in which the nanotubes have little if any alignment, for example along the principal axis of the said fibres or strips. To achieve this, the external solution used during the second stage of the method according to the invention must be of low viscosity relative to the aqueous dispersion of nanotubes, in the same conditions of temperature and pressure, its flow rate must be slow and the extrusion orifice must be wide.

With a view to obtaining an end product possessing improved mechanical and electrical properties relative to the prior art, in the dispersion of particles we can either use "single-wall" carbon nanotubes (i.e. composed of a single graphite cylinder), or "multiwall" carbon nanotubes (which are composed of several concentric graphite cylinders) can be used; the single-wall nanotubes have better mechanical and electrical properties than the multiwall nanotubes, but at present they cost more to produce.

According to another advantageous characteristic of the invention, the carbon nanotubes used in the dispersion are modified chemically by grafts of molecular groups, for example polyethyl glycol groups or acid groups. These grafts can increase the bonding between the fibres or strips obtained (bonds of the van der Waals type, hydrophobic bonds or hydrogen bonds), and have the advantage of strengthening materials composed of these fibres or strips.

The fibres or strips according to the invention have a porosity that permits the introduction of particles, e.g. of carbon or polymers, into these pores. Introduction of these particles also endows the fibre with better cohesion and better resistance to mechanical stressing.

According to yet another advantageous characteristic of the invention, the fibres obtained from carbon nanotubes are used for reinforcing materials, in particular composites and cables. In fact, the said fibres have the characteristics of conventional carbon (thermal and chemical resistance, strength of the atomic bonds in the graphite layers) but are less fragile in torsion. Thus, production of composites that are more flexible can be envisaged, even cables or textiles based solely on carbon nanotubes.

According to yet another advantageous characteristic of the invention, the fibres and strips obtained from carbon nanotubes are used as conductors, semiconductors or insulators depending on their temperature and their structure in the field of electronics and microelectronics.

According to yet another advantageous characteristic of the invention, the fibres and strips obtained from carbon nanotubes are used as systems for emission of electrons by the nanotubes (displays, for example).

According to yet another advantageous characteristic of the invention, the fibres and strips obtained from carbon nanotubes are used as artificial muscles or electromechanical actuators for various mechanical systems. Thus, films of single-wall carbon nanotubes with random orientation undergo mechanical deformation under electrical effects, and these deformations are amplified with aligned systems. More generally, these fibres or strips can be used for devices for converting electrical energy to mechanical energy (or vice versa).

It is also possible to envisage applications of these fibres and strips in optical or electro-optical devices (electrodiffusion, optical limitation, etc.), as catalysts or catalyst supports in chemical reactions, as electrodes for electrochemistry, for hydrogen storage in battery systems (in particular for fibres made from carbon nanotubes), as a tip for near-field microscopy (tunnel-effect and atomic-force microscopy), as filter membranes, as chemical detectors (the electrical resistance of the carbon fibres varies as a function of the chemical environment), or in uses for the production of biomaterials (prostheses, tendons, ligaments, etc.).

Finally, it is possible to use the fibres or strips according to the invention as converters of mechanical energy to electrical energy and vice versa. In fact, mechanical stressing of these fibres or strips gives rise to the appearance of electrical charges on them and the fibres or strips deform under electrical effects. Examples of uses are mechanical stress sensors, sound sensors, ultrasound sensors, etc.

In addition, it is possible to envisage using the fibres or strips according to the invention for making electrochemical detectors and/or electrodes.

The present invention as described above offers numerous advantages; in particular, such a method makes it possible to obtain fibres from particles such as carbon nanotubes, or in general from particles dispersed in a solution.

The invention claimed is:

1. A method of obtaining fibres and strips from colloidal particles, comprising:
   dispersing said colloidal particles in a solvent to form a dispersion, wherein said colloidal particles are carbon nanotubes; and
   injecting the dispersion through at least one orifice opening into a laminar flow of an external solution, wherein the external solution is flowing in substantially the same direction as the injected dispersion, wherein the viscosity of the external solution is greater than that of the dispersion, the viscosities being measured in the same conditions of temperature and pressure, destabilizing the dispersion of particles so as to cause aggregation of said particles, and aligning said particles in a direction imposed by the flow of the external solution to obtain fibers and strips of colloidal particles.

2. The method of claim 1, wherein the solvent is aqueous or organic, and wherein said dispersing is done with the aid of a surfactant, wherein the surfactant is molecular or polymeric, and anionic, cationic, or neutral.

3. The method of claim 1, wherein the external solution contains a viscosity modifier, and wherein the viscosity modifier is a polymer or a mineral.

4. The method of claim 3, wherein the viscosity modifier is a polyvinyl alcohol or cellulose.

5. The method of claim 3, wherein the viscosity modifier is clay.

6. The method of claim 3, wherein the external solution includes a flocculating agent, and wherein this agent is one of: a polymer that is capable of producing bridging effects; a salt; or a surfactant.

7. The method of claim 6, wherein said dispersing is done with the aid of an ionic surfactant, and wherein said flocculating agent is a surfactant that is neutral or of charge opposite to that of the surfactant used for dispersing said particles.

8. The method of claim 6, wherein the flocculating agent is constituted of polyvinyl alcohol having a molecular weight between 10 000 and 200 000.

9. The method of claim 1, wherein said fibres or strips are densified by capillary contraction.

10. The method of claim 1, further comprising:
    washing said fibres or strips with a rinsing product so as to desorb one or more of: said external solution, and a surfactant used to disperse said particles in the dispersion.

11. The method of claim 10, wherein said fibres or strips are withdrawn vertically from the rinsing product.

12. The method of claim 10, further comprising: annealing said fibres or strips.

13. The method of claim 12, wherein said annealing includes the addition of one or more of: a polymer and a plasticizer.

14. The method of claim 1, wherein the external solution contains particles of micrometer or nanometer size for forming an outer envelope around the said fibres or strips.

15. The method of claim 1 wherein the external solution is flowing at least as rapidly as the injected solution.

16. A method of obtaining fibres and strips from colloidal particles, comprising:
    dispersing said colloidal particles in a solvent to form a dispersion, wherein said colloidal particles are carbon nanotubes;
    injecting the dispersion through at least one orifice opening into a laminar flow of an external solution, wherein the external solution is flowing in substantially the same direction as the injected dispersion; and
    destabilizing the dispersion of particles so as to cause aggregation of said particles; and
    aligning said particles in a direction imposed by the flow of the external solution to obtain fibers and strips constituted of colloidal particles and having a density of about 1.5 g/cm$^3$.

* * * * *